June 11, 1935.  E. B. HAMILTON  2,004,241
EDUCATIONAL MAP
Filed Feb. 16, 1934   3 Sheets-Sheet 1
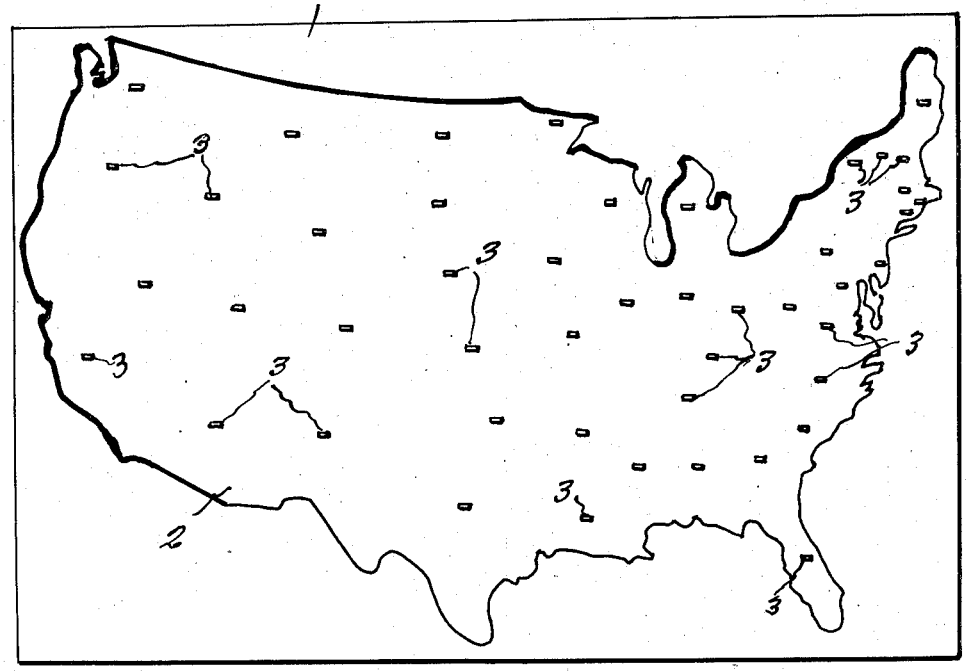
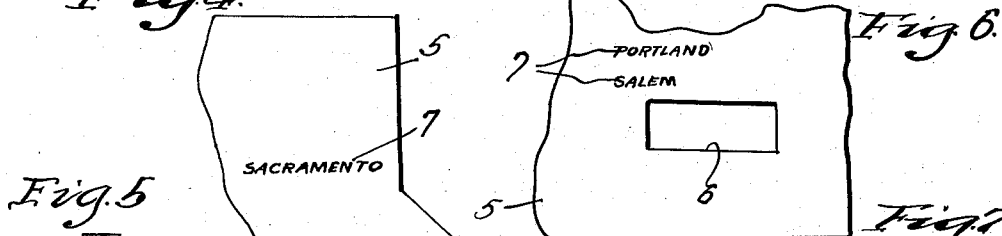
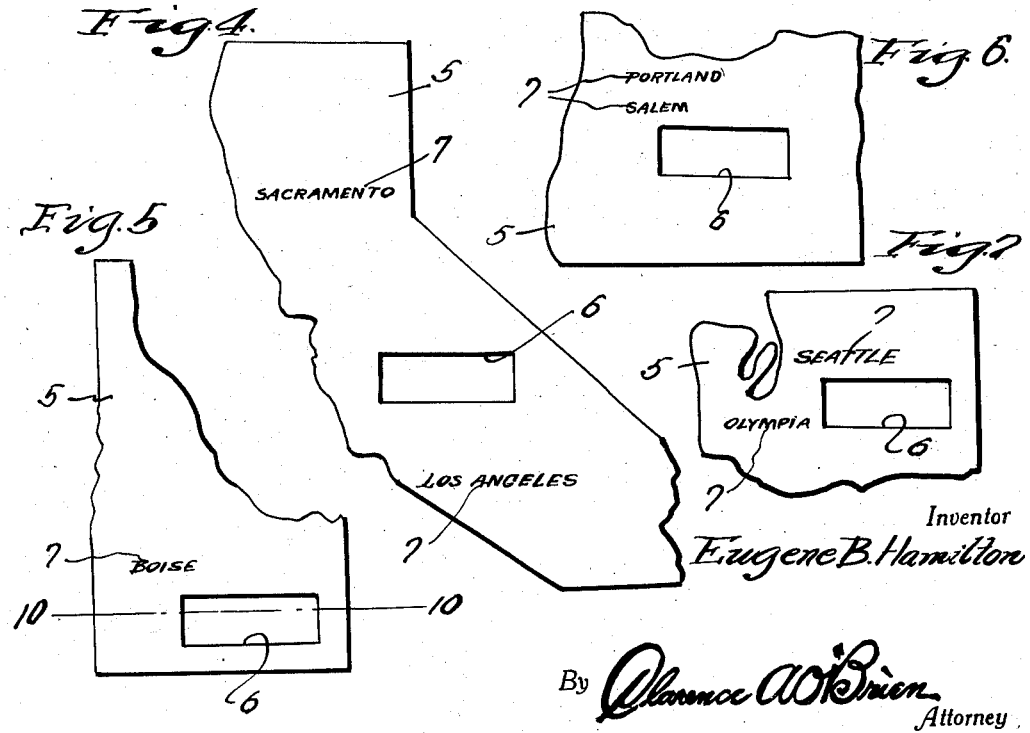
Inventor
Eugene B. Hamilton
By Clarence A. O'Brien
Attorney June 11, 1935.   E. B. HAMILTON   2,004,241
EDUCATIONAL MAP
Filed Feb. 16, 1934   3 Sheets-Sheet 2
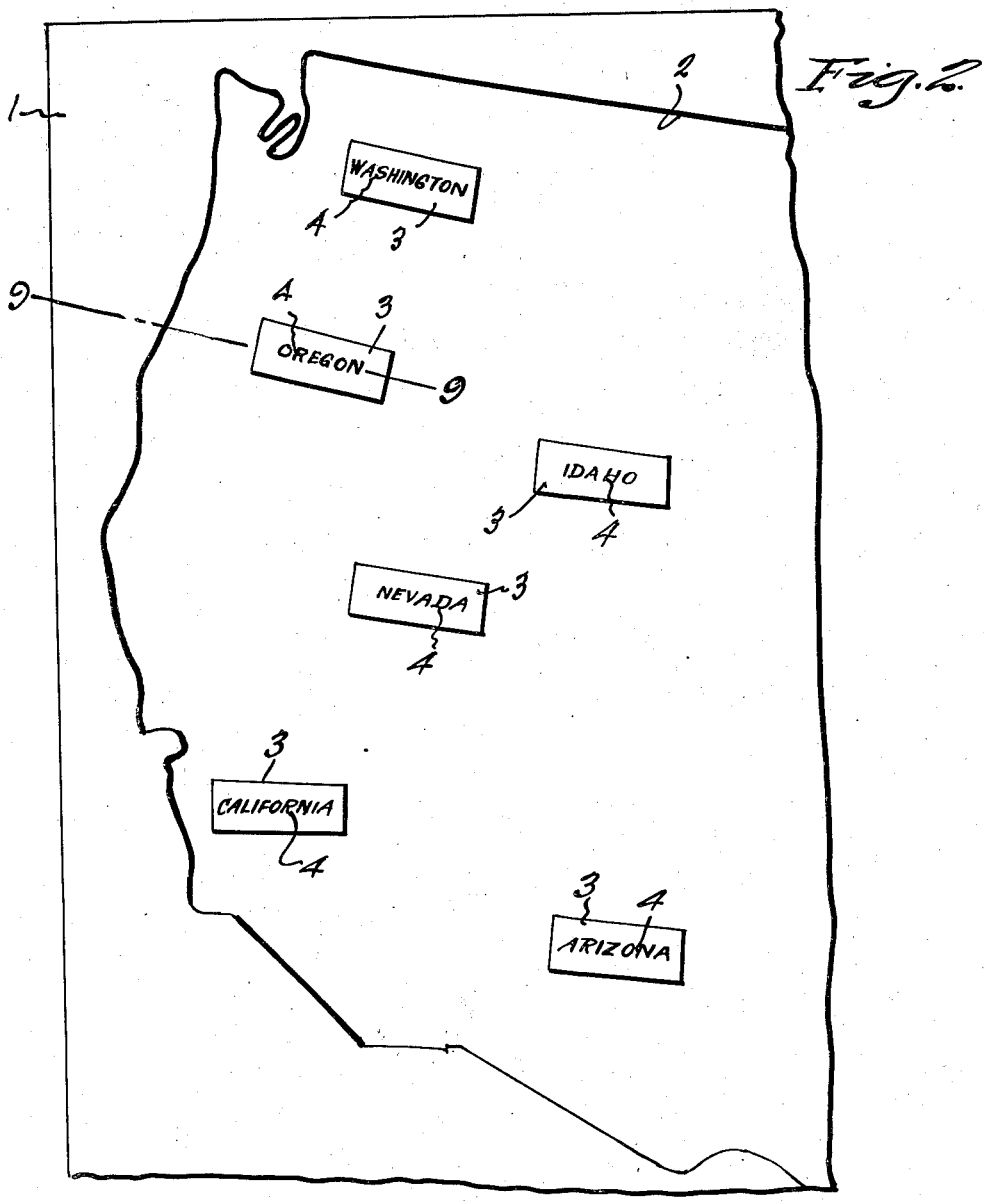
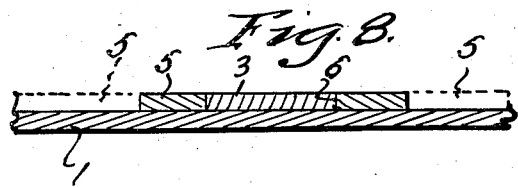

June 11, 1935. E. B. HAMILTON 2,004,241
EDUCATIONAL MAP
Filed Feb. 16, 1934     3 Sheets-Sheet 3
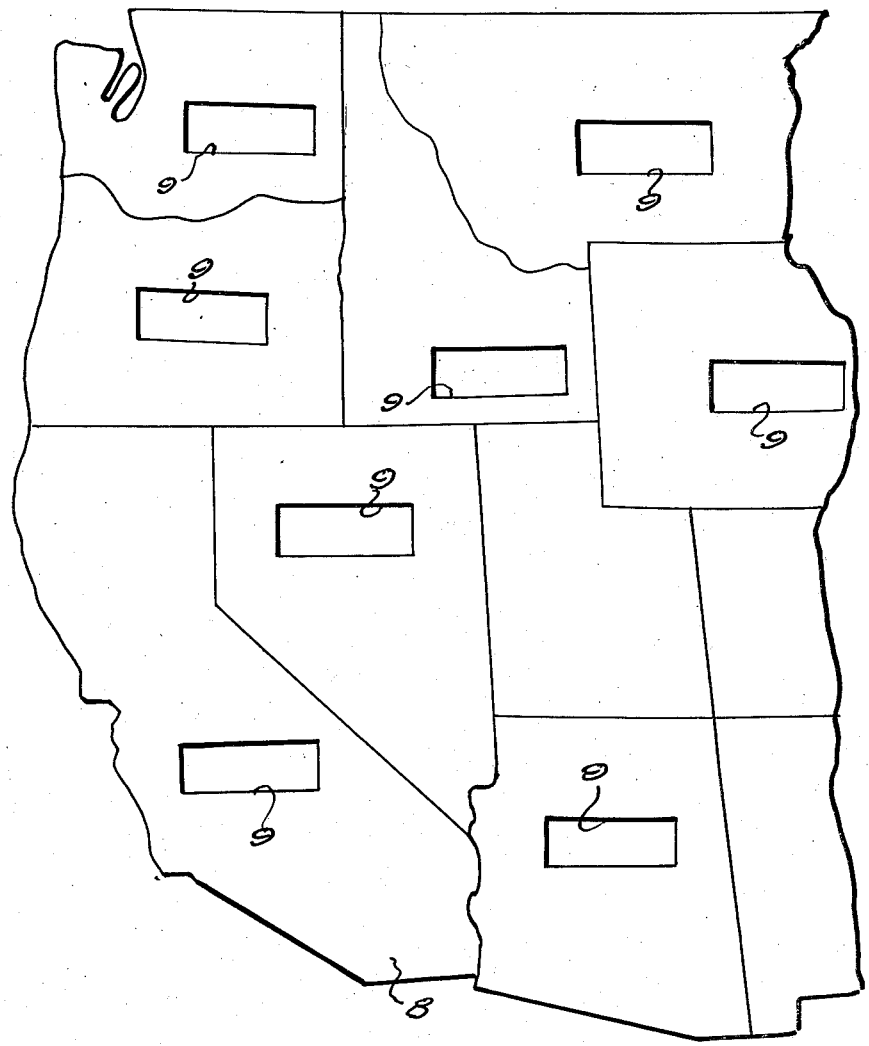
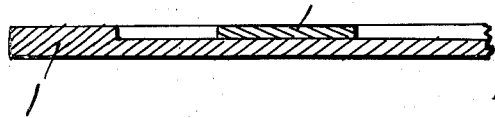
Inventor
Eugene B. Hamilton
By Clarence A. O'Brien
Attorney Patented June 11, 1935

2,004,241

UNITED STATES PATENT OFFICE 2,004,241

EDUCATIONAL MAP

Eugene B. Hamilton, Boston, Mass.

Application February 16, 1934, Serial No. 711,586

3 Claims. (Cl. 35—42)

The present invention relates to new and useful improvements in educational maps and has for its primary object to provide a map of this character embodying a novel construction, combination and arrangement of parts for teaching geography in a highly attractive and interesting manner.

Other objects of the invention are to provide a map of the aforementioned character which will be simple in construction, strong, durable, attractive in appearance and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:—

Figure 1 is a view in top plan of the base portion of the invention.

Figure 2 is a fragmentary view in top plan showing, on an enlarged scale, a portion of the base portion shown in Figure 1.

Figure 3 is a fragmentary view in plan, showing a portion of the sheet which facilitates placing of the sections in position.

Figures 4 to 7, inclusive, are detail views in plan of several of the removable sections.

Figure 8 is a fragmentary view in vertical section, showing one of the removable sections mounted in position on the base.

Figure 9 is a fragmentary view in vertical section, taken substantially on the line 9—9 of Figure 2.

Figure 10 is a detail view in vertical section, taken substantially on the line 10—10 of Figure 5.

Referring now to the drawings in detail, it will be seen that the embodiment of the invention which has been illustrated comprises a substantially rectangular base 1 of suitable dimensions and material having formed thereon a depressed map 2 of, for example, the United States, the nationl boundaries only of which are shown. This is illustrated to advantage in Figures 1 and 2 of the drawings. Fixed on the depressed map 2, one in the area covered by each State, is a substantial rectangular protuberance or projection 3 which may be secured in position by any suitable means, such as an adhesive. The upstanding projections 3 have printed thereon the names of the States, as indicated at 4.

The reference numeral 5 designates a plurality of removable pieces or sections which are to be placed in proper position on the map 2, said sections having the outlines of different States and, of course, being adapted to interfit when properly placed. The removable sections or pieces 5 have formed therein rectangular openings 6 for the reception of the protuberances 3, as seen in Figure 8 of the drawings. It will be noted that the sections are of substantially the same thickness as the protuberances 3 so that the upper surfaces thereof are substantially flush. The pieces 5 may have printed thereon the names of one or more of the principal cities of the States which said pieces represent, as indicated at 7.

The reference numeral 8 designates a sheet which, if desired, may be placed over the map 2 to assist beginners. The sheet 8, it will be noted, has the various States outlined thereon and said sheet has formed therein substantially rectangular openings 9 which accommodate the protuberances 3. The sheet 8 may be of any suitable material, preferably paper of suitable thickness.

As is believed to be readily apparent, the object is for the player or student to recognize the States represented by the removable pieces 5 by the shape or outlines thereof and place said pieces 5 properly on the depressed map 2 where they are secured or retained by the protuberances 3 which, as hereinbefore stated, engage in the openings 6. When all of the pieces 5 have been properly placed a complete map of the United States will be had, as will be understood. To assist in making difficult decisions the sheet 8 may be placed in position on the map 2 and then removed or, for beginners, said sheet may be left on the map 2 and the pieces 5 placed thereon. Of course, the protuberances 3 will project through the openings 9 of the sheet 8 for engagement in the openings 6 of the pieces 5.

It is believed that the many advantages of an educational map in accordance with the present invention will be readily understood, and although a preferred embodiment of the invention is as illustrated and described, it is to be understood that changes in the details of construction and in the combination and arrangement of parts may be resorted to which will fall within the scope of the invention as claimed.

What is claimed is:—

1. A device of the class described comprising a base having a map outlined thereon, protuberances rising from the map at spaced points, a sheet adapted to be mounted on the map and having openings therein accommodating the protuberances, and a plurality of complemental, removable sections adapted to be positioned on the sheet, said sections having openings therein for the reception of the protuberances.

2. A device of the class described comprising a substantially flat base having a depressed map outlined thereon, substantially rectangular protuberances rising from the map at spaced points, said protuberances having indicia thereon identifying different areas of the map, a sheet of comparatively thin, flexible material removably engageable on the map and having substantially rectangular openings therein for the accommodation of the protuberances, and a plurality of complemental, interfitting map sections adapted to be positioned on the sheet, said sections having substantially rectangular openings therein for the reception of the protuberances.

3. A device of the class described comprising a base having a recess in its upper face, the side walls of which form the exterior boundaries of a map of a country, a sheet removably located in the recess and having on one face thereof lines indicating the States of the country, a plurality of complementary removable blocks adapted to be fitted together and placed in the recess and upon the sheet with certain edges of certain of the blocks abutting the said walls, said blocks being shaped to represent the States of the country.

EUGENE B. HAMILTON.